United States Patent [19]

Salvio et al.

[11] Patent Number: 5,619,036
[45] Date of Patent: Apr. 8, 1997

[54] LOW COST NIGHT VISION CAMERA FOR VEHICLES AND MOUNTING THEREOF

[75] Inventors: Paul Salvio, Pue; Kevin Walsh, El Segundo, both of Calif.

[73] Assignee: Hughes Electronics, Los Angeles, Calif.

[21] Appl. No.: 514,550

[22] Filed: Aug. 14, 1995

Related U.S. Application Data

[63] Continuation-in-part of Ser. No. 226,728, Apr. 12, 1994.
[51] Int. Cl.$^6$ ........................................ G09G 5/00
[52] U.S. Cl. ........................... 250/330; 348/148
[58] Field of Search ..................... 250/330, 332, 250/334, 353; 359/859, 851; 348/148, 164

[56] References Cited

U.S. PATENT DOCUMENTS

| | | | |
|---|---|---|---|
| 4,815,757 | 3/1989 | Hamilton | 280/764.1 |
| 5,001,558 | 3/1991 | Burley et al. | 358/113 |
| 5,414,439 | 5/1995 | Groves et al. | 345/7 |

Primary Examiner—David P. Porta
Assistant Examiner—Richard Hanig
Attorney, Agent, or Firm—Gordon R. Lindeen, III; Wanda K. Denson-Low

[57] ABSTRACT

An arrangement (10) for mounting a night vision enhancement system to a vehicle (1010). The invention is adapted for use with a night vision enhancement system having an infrared camera (14) and a display (587). In the preferred embodiment, the invention (10) includes a mounting mechanism (16) disposed at a front end of said vehicle (1010) for retaining the camera (14). Optionally, a door (42) is included for protecting the camera (14). The door (42) is actuated on command between open and closed positions by a solenoid (44) attached to the frame of the vehicle on one end and to a linkage (48, 49) on the other. The linkage (48, 49) allows the door (42) to pivot in response to the movement of the solenoid plunger (45). The camera (14) is retained in an upside down orientation by a bracket (16) which is attached to the frame of the vehicle.

13 Claims, 3 Drawing Sheets

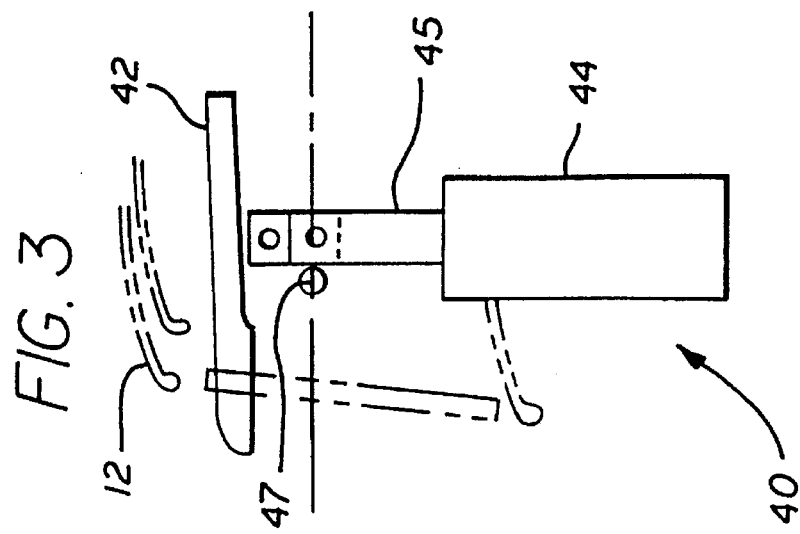
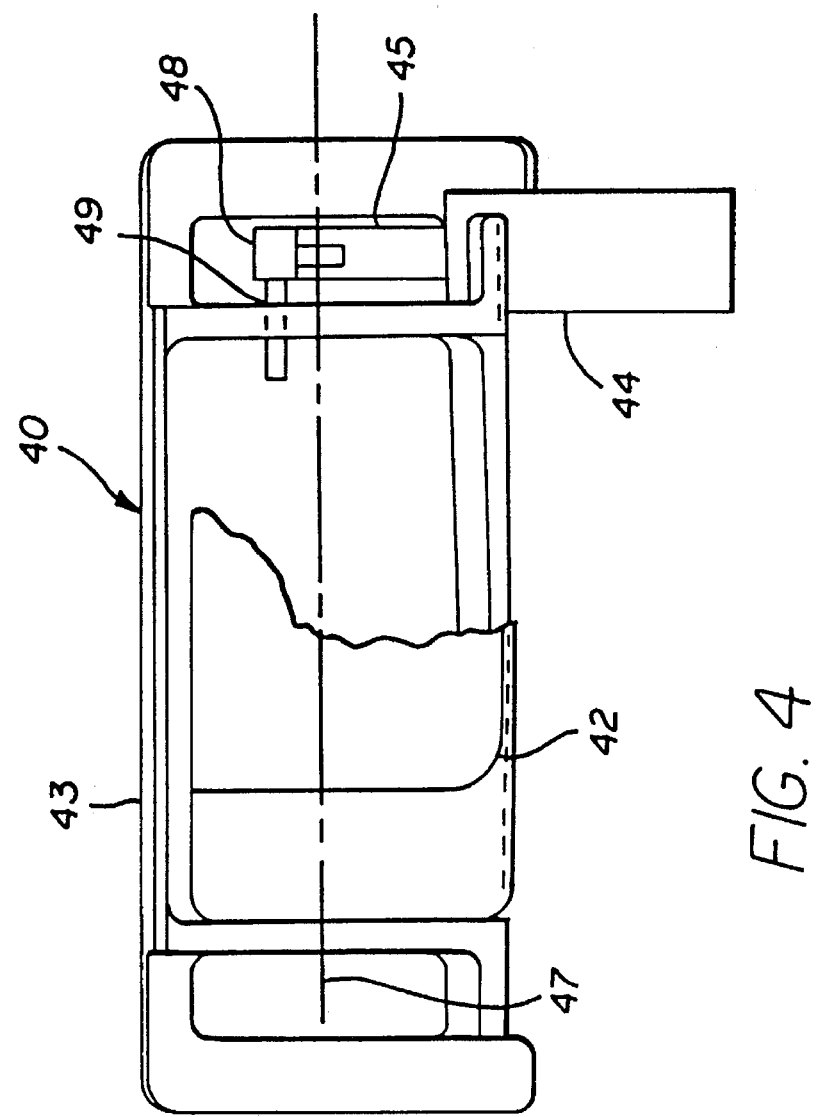

LOW COST NIGHT VISION CAMERA FOR VEHICLES AND MOUNTING THEREOF

REFERENCE TO RELATED APPLICATION

This is a continuation-in-part to U.S. patent application Ser. No. 08/226,728, entitled LOW COST NIGHT VISION ENHANCEMENT SYSTEM FOR VEHICLES, filed Apr. 12, 1994.

BACKGROUND OF THE INVENTION

1. Field of the Invention

The present invention relates to imaging systems. More specifically, the present invention relates to night vision systems.

2. Description of the Related Art

Approximately 55% of all traffic fatalities occur at night, a figure which is somewhat alarming when considered in light of the fact that only 28% of all driving occurs at night. This is due at least in part to the fact that many drivers often travel at a speed at which objects and changes in the contours of the road are approached within a time frame which is insufficient to allow the driver to react given the range of vision afforded by the illumination of the road with ordinary automotive headlights.

This is exacerbated by the fact that many drivers lose some visual acuity at night and night vision is often temporarily impaired by glare from the headlights of oncoming vehicles. An additional area of concern relates to personal security and safety from would-be assailants lurking in obscure areas around a vehicle parking area.

Thus, for many reasons, there has been a need in the art for a night vision system for vehicles.

The invention of the parent application discloses and claims a night vision system for law enforcement vehicles which substantially addresses the above-identified need in the art. In the exemplary embodiment, an infrared camera is mounted on the top of the vehicle. While this is an advantageous location for law enforcement applications, for esthetic and other practical considerations, this arrangement is regarded as undesirable for consumer applications. Accordingly, a need remains for a system for mounting night vision cameras on civilian vehicles which is practical, esthetic and effective.

Burley (U.S. Pat. No. 5,001,558) shows a television camera mounted in the front of the vehicle. An infrared sensor is provided to enhance the image generated by the TV camera. The image is not suitable for night time driving.

Hence, a need remains in the art for improvements in the mounting and protection of infrared cameras in vehicles.

SUMMARY OF THE INVENTION

The need in the art is addressed by the present invention which provides an arrangement for mounting a night vision enhancement system to a vehicle. The invention is adapted for use with a night vision enhancement system having an infrared camera and a display. The invention includes a mounting mechanism for mounting the camera to the vehicle.

In the preferred embodiment, a door is disposed in the line of sight of the camera. The door is actuated on command between open and closed positions by a solenoid attached to the frame of the vehicle on one end and to a linkage on the other. The linkage is connected to the door and allows the door to pivot in response to the movement of the solenoid plunger.

The camera is retained by a bracket which is welded to the frame of the vehicle.

BRIEF DESCRIPTION OF THE DRAWINGS

FIG. 3 is an elevated side view of the door assembly of FIG. 2.

FIG. 4 is an elevated front view of the door assembly of FIG. 2.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
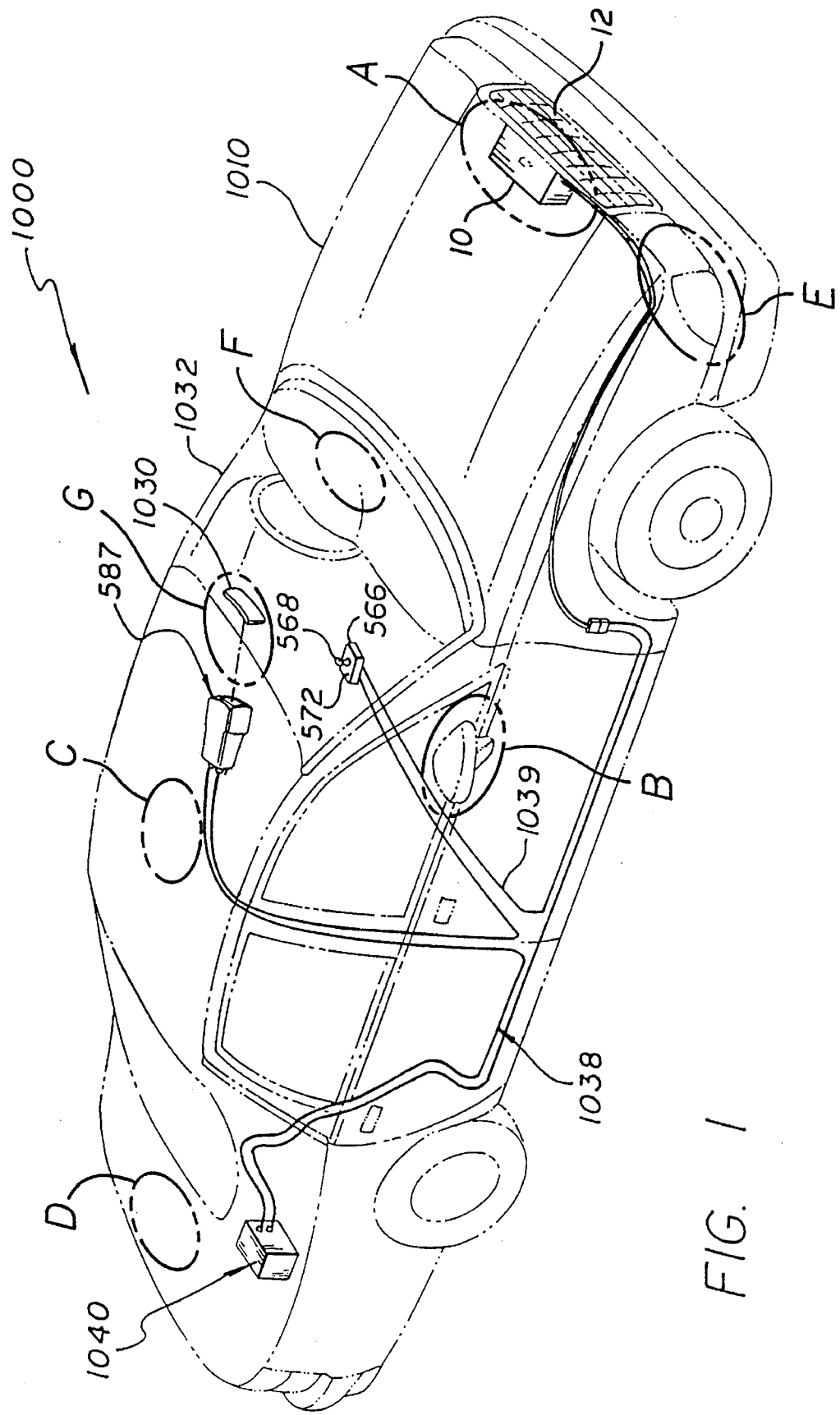
FIG. 1 shows various locations at which a night vision camera can be mounted to a vehicle.

FIG. 1 is a schematic diagram of the low cost night vision enhancement system of the present invention. FIG. 1 shows various locations at which a night vision camera can be mounted to a vehicle. In accordance with the teachings of the present invention, system 1000 includes a night vision camera assembly 10 mounted in the front of a vehicle 1010 (shown in phantom) behind the grille 12 thereof.

Figure 2:
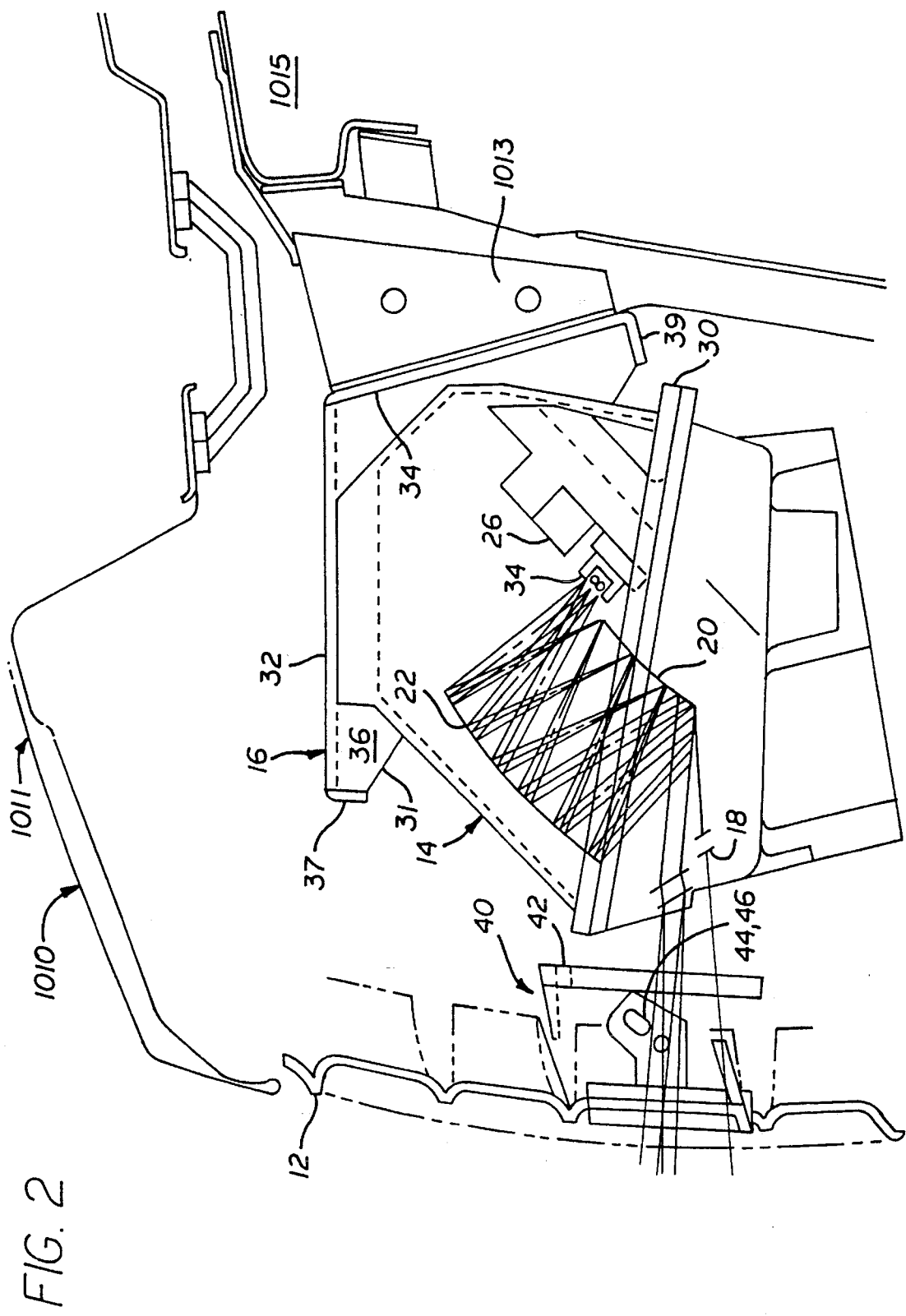
FIG. 2 is a side view of the camera assembly of the present invention mounted under the hood and behind the grille of a vehicle at location "A" of FIG. 1.

FIG. 2 is a side view of the camera assembly 10 mounted under the hood 1011 and behind the grille 12 of the vehicle 1010. The camera assembly 10 includes an infrared camera 14 which is secured to the vehicle by a bracket 16. While the camera 14 may be of any suitable design, in the preferred embodiment, the camera 14 is constructed in accordance with the teachings of U.S. patent application Ser. No. 08/232,893, entitled Low Cost Night Vision Camera, filed Apr. 12, 1994, by Klapper et al., (Atty. Docket No. PD 94073), the teachings of which are incorporated herein by reference.

Briefly, as disclosed in the above-noted reference, light enters the camera 14 through a window 18 and is focused onto thermal detectors by high speed optics. The housing 30 is secured to the vehicle 1010 by the bracket 16.

The bracket 16 secures and protects the camera 14 behind the grille 12 in an upside down orientation. The bracket 16 is constructed of steel or other suitable material. The bracket 16 has flat top, back and side sections 32, 34, 36 and 38 (not shown) respectively. The bracket 16 has front and bottom flanges 37 and 39. The sides 36 and 38 are triangular in shape so that the bracket 16 is in the shape of a box which is cut along the diagonal thereof and therefore open to receive the camera 14. The bottom section 31 of the camera housing 30 is secured to the top surface 32 of the bracket 16 with screws (not shown) so that the camera 14 is retained in an upside down orientation as illustrated in FIG. 2. The camera 14 is mounted to have an unobstructed field of view.

The back surface 34 of the bracket 16 is attached to the frame or chassis 1013 of the vehicle 1010 in front of the radiator 1015.

A door assembly 40 is mounted in the grille 12 in front of the camera assembly 10. The door assembly 40 includes a pivotally mounted door 42, a solenoid 44 and a linkage 46 connecting same.

FIG. 3 is an elevated side view of the door assembly. FIG. 4 is an elevated front view of the door assembly. The door 42 is designed and connected for rotational motion about a pivot 47. The door 42 is opened and closed by the up and down motion of a solenoid plunger 45 within the solenoid 44. The solenoid 44 may be a latching solenoid of conventional design. The bottom of the solenoid 44 is attached to the frame or chassis of the vehicle. As best illustrated in FIG. 4, the solenoid plunger 45 is pivotally connected to the door 42 by an actuator link 48 and an actuator pin 49. The door 42 is attached to a door housing 43 by the door pivot 47. On a production car, the door housing would be integrated into the grille of the vehicle.

FIG. 3 shows the door 42 in an open position. The door 42 opens in response to a movement of the plunger 45 in a downward position. The door 42 closes in response to the movement of the plunger in the opposite direction.

The upside down orientation of the image provided by the camera 14 is corrected by the electronic signal processing circuitry of the system. Signals from the camera are inverted for right-side up display. The upside down orientation of the camera and reorientation of the image on display is effective to abate the undesirable natural curvature of the image.

Returning to FIG. 1, the night vision camera 14 is connected to a display unit which, in the illustrative embodiment, may be implemented as a "Datavision" head up display (HUD) available from Hughes Aircraft Company. The Datavision HUD includes a projector display 587, a combiner 1030, and cables 1038 and 1039. The combiner 1030 is mounted on the windshield 1032 or projected directly on the windshield (shown in phantom) of the vehicle 1010 for displaying a real image from the projector 587. The cables are stowed in mounting brackets and the cables are shielded.

The video display is not limited to a Datavision HUD. Alternatively, an active matrix liquid crystal display (LCD) mounted on the dashboard of the vehicle can be used to display the real image from the camera. Active matrix LCDs are available from Citizen, Sharp and Toshiba to name a few.

Instead of displaying a real image, the video display can display a virtual image. The virtual image can be displayed by "Virtual Image Glasses" available from Virtual Vision in Redmond, Wash. The Virtual Image Glasses project a TV-like, wide screen image in front of the bumper of the vehicle. An officer wears the glasses to view the scene ahead. Data is transmitted either through hard-wired connections or wireless (e.g., spread spectrum) transmission from the camera to the glasses. Instead of the glasses, a helmet-mounted visor can be used to project the TV-like, wide screen image in front of the bumper of the vehicle. One such helmet-mounted visor is disclosed in U.S. Pat. No. 5,035,074, issued to Chen, the teachings of which are incorporated herein by reference.

Alternatively, a virtual image can be displayed directly on the vehicle windshield by the virtual display disclosed and claimed in U.S. patent application Ser. No. 07/971,799, entitled "Virtual Image Instrument Panel Display" and assigned to the assignee of the present invention. This system, which includes mirrors and an active matrix LCD as a source, can be installed at the vehicle manufacturer, or it can be installed as an after market add-on.

Thus, the present invention has been described herein with reference to a particular embodiment for a particular application. Those having ordinary skill in the art and access to the present teachings will recognize additional modifications applications and embodiments within the scope thereof. In addition, the camera can be aesthetically styled into the car by a person skilled in the art.

It is therefore intended by the appended claims to cover any and all such applications, modifications and embodiments within the scope of the present invention.

Accordingly,
What is claimed is:

1. A night vision enhancement system for a vehicle, the night vision enhancement system comprising:

an infrared camera for providing output signals for use in displaying an image;

a display for displaying the signals provided by the camera in a first orientation when the camera is mounted in a first orientation;

mounting means for retaining said camera to said vehicle; and shield means for protecting said camera, wherein said shield means includes a door disposed in the line of sight of said camera.

2. The invention of claim 1 wherein said shield means further includes means for actuating said door between substantially open and substantially closed positions.

3. The invention of claim 2 wherein said means for actuating includes a solenoid actuator mounted at one end thereof to a frame of said vehicle and connected at another end to said door.

4. The invention of claim 3 wherein said solenoid actuator is connected to said door through a linkage.

5. A night vision enhancement system for a vehicle, the night vision enhancement system comprising:

an infrared camera for providing output signals for use in displaying an image;

a display for displaying the signals provided by the camera in a first orientation when the camera is mounted in a first orientation; and mounting means for retaining said camera to said vehicle, wherein said mounting means includes means for retaining said camera in a second orientation.

6. The invention of claim 5 wherein said first orientation is a right-side up orientation and said second orientation is an up-side down orientation.

7. The invention of claim 6 wherein said means for retaining is a bracket.

8. The invention of claim 7 wherein said bracket is welded to a frame of said vehicle.

9. The invention of claim 8 wherein said means for retaining includes means for securing said camera to said bracket in said second orientation.

10. A mounting arrangement for a night vision enhancement system for a vehicle, the night vision enhancement system including an infrared camera for providing output signals for use in displaying an image and a display for displaying the signals provided by the camera in a first orientation when the camera is mounted in a first orientation, said night vision enhancement system comprising:

mounting means disposed at a front end of said vehicle for retaining said camera in a second orientation, said first orientation being a right-side up orientation and said second orientation being an up-side down orientation, said mounting means including:

a bracket attached to said vehicle and means for securing said camera to said bracket in said second orientation.

11. A night vision enhancement system for a vehicle comprising:

an infrared camera for providing output signals for use in displaying an image;

mounting means disposed at a front end of said vehicle for retaining said camera in an upside down orientation;

shield means for protecting said camera; and means for displaying the signals provided by the camera.

12. A night vision enhancement system for a vehicle comprising:

an infrared camera having a right-side up orientation and an upside down orientation;

means for mounting said camera at a front end of the vehicle in the upside down orientation;

means for inverting electrical signals output by said camera for display in a right side up orientation; and means for displaying said electrical signals provided by said camera.

13. A method for installing a vision enhancement system to a vehicle including the steps of:

providing a camera having a right-side up orientation and an upside down orientation;

mounting said camera at a front end of a vehicle in the upside down orientation;

inverting electrical signals output by said camera for display in a right side up orientation; and displaying said electrical signals provided by said camera.

* * * * *